J. SCHOLL.
Grain-Spout.
No. 209,362.  Patented Oct. 29, 1878.
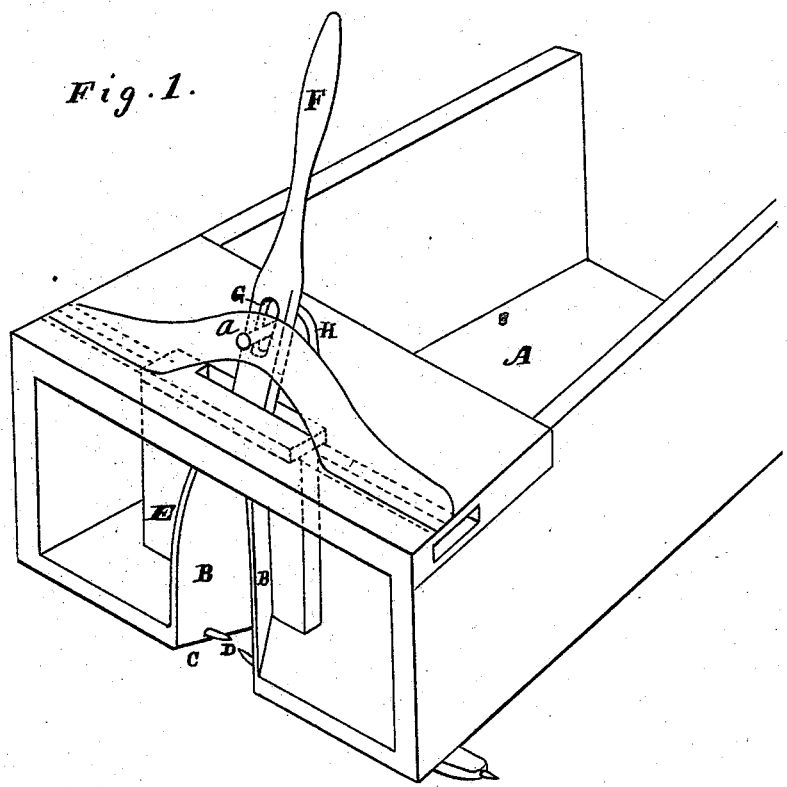
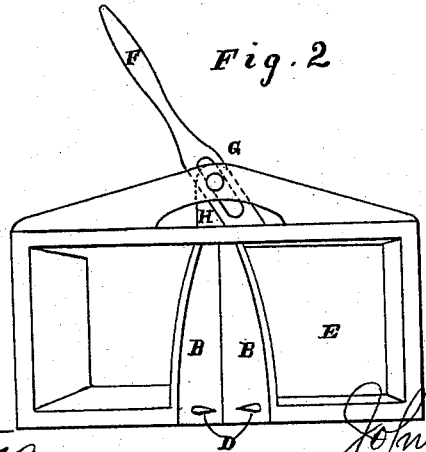
Witnesses
Geo. H. Strong.
Jno. L. Booke
Inventor
John Scholl
by Dewey
Attys

UNITED STATES PATENT OFFICE.

JOHN SCHOLL, OF ELK GROVE, CALIFORNIA.

IMPROVEMENT IN GRAIN-SPOUTS.

Specification forming part of Letters Patent No. 209,362, dated October 29, 1878; application filed February 16, 1877.

*To all whom it may concern:*

Be it known that I, JOHN SCHOLL, of Elk Grove, county of Sacramento, and State of California, have invented a Grain-Sacking Device for Thrashing-Machines; and I do hereby declare the following to be a full, clear, and exact description thereof, reference being had to the accompanying drawings.

The object of my invention is to provide a device for the continuous sacking of grain as it passes from a thrashing-machine and separator without interruption while substituting empty for full sacks, and without the loss of grain which usually occurs during such a change.

It consists of a chute or spout through which the grain can flow, and which is provided with an outwardly-flaring diaphragm just at the mouth, so that the chute is divided into two outlets at this point. Each of these passages is provided with an independent set of hooks for holding the sacks, and the chute has a gate made to move across its width just back of the diaphragm, so as to stop either of the passages alternately. A lever passes through the covered top of the chute and operates this gate.

Referring to the accompanying drawings for a more complete explanation of my invention, Figure 1 is a perspective view, and Fig. 2 is a front view, of my device.

A is a section of a chute or spout, which is employed to convey thrashed grain from the separator to the sacks. This spout has at its mouth a diaphragm or separating-partition composed of two vertical pieces, B, flaring outwardly, as shown, so as to form the mouth into two distinct passages. A beveled cut, C, in the floor of the chute, corresponding with the shape of the diaphragm, allows one sack for each opening, to be fitted closely around the outlet, and hooks or points D retain each sack in position.

The chute is covered from the mouth back toward the machine, and beneath the cover, just back of the diaphragm B, is a gate, E, which is large enough to cover one of the outlet-passages. This gate slides easily from side to side, and has a lever, F, pivoted to its center, extending thence up through the top of the chute, so as to be operated easily from the outside. This lever is slotted at G, and has a pin, $a$, passing through the slot to secure it to a suitable standard, H. This slot allows an up-and-down movement of the lever to compensate for the transverse sliding movement of the gate.

It will be seen that while one sack is being filled the flow of grain is shut off from the other half, and an empty sack can be easily adjusted to this side. When the first sack is full the flow is easily diverted to the empty sack without wasting a grain, and time is allowed for removing the full sack and replacing it by an empty one. By placing the gate close to this discharge, which I am enabled to do by making it a slide instead of an oscillating diaphragm, I cut off the flow of the grain just at the lower end of the spout, so that when the sack upon one side is filled the grain is all diverted to the other side, and there is no quantity left in the spout to overflow. By placing the gate close to the outlet, I can wait until the sack is full before I shut it off, and there will be no waste.

The bifurcated form of the discharge is especially advantageous, as it allows me to closely fit sacks to each side, while I at the same time avoid the necessity of forming two distinct spouts, which would necessitate a gate or gates placed at a considerable distance from the outlet, and the consequent danger of waste, or the retention of a considerable quantity of grain in the spout after finishing.

The whole construction gives me virtually a single inclined discharge-spout for the grain from a thrashing-machine, but with a double outlet, by which the continuous stream of grain may be alternately diverted from one outlet to the other with no waste.

Having thus described my invention, I do not claim, broadly, the employment of double discharge-spouts, nor the employment of swinging or oscillating gates in combination with such spouts; but

What I do claim as new, and desire to secure by Letters Patent, is—

The single chute A, having the beveled cut C made in its floor at the front, and two sets of hooks, D, for holding sacks, in combination with the diaphragm B and the horizontally-sliding gate E, placed close to the outlet immediately above the hooks, and adapted to close one side while opening the other, substantially as shown, and for the purpose herein described.

In witness whereof I have hereunto set my hand and seal.

JOHN SCHOLL. [L. S.]

Witnesses:
  GEO. H. STRONG,
  OLWYN T. STACY.